US012436491B2

(12) United States Patent
Araishi

(10) Patent No.: US 12,436,491 B2
(45) Date of Patent: Oct. 7, 2025

(54) ELECTRONIC APPARATUS WITH PROJECTING MEMBER PROJECTING FROM INSIDE SURFACE OF DOOR TOWARD INTERIOR OF APPARATUS BODY

(71) Applicant: KYOCERA Document Solutions Inc., Osaka (JP)

(72) Inventor: Kuniaki Araishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/612,101

(22) Filed: Mar. 21, 2024

(65) Prior Publication Data

US 2024/0329592 A1 Oct. 3, 2024

(30) Foreign Application Priority Data

Mar. 31, 2023 (JP) ................................ 2023-057306

(51) Int. Cl.
*G03G 15/00* (2006.01)
*G03G 21/16* (2006.01)

(52) U.S. Cl.
CPC ..... *G03G 21/1633* (2013.01); *G03G 15/5016* (2013.01); *G03G 2215/00544* (2013.01); *G03G 2215/0078* (2013.01); *G03G 2221/169* (2013.01)

(58) Field of Classification Search
CPC .......... G03G 15/5016; G03G 21/1633; G03G 2215/00544; G03G 2215/0078; G03G 2221/169
See application file for complete search history.

(56) References Cited

U.S. PATENT DOCUMENTS

2017/0277114 A1* 9/2017 Yoshida ............ G03G 21/1633
2019/0300305 A1* 10/2019 Nakanosono ...... G03G 15/6502

FOREIGN PATENT DOCUMENTS

JP 2000162944 A 6/2000

* cited by examiner

*Primary Examiner* — Hoang X Ngo
(74) *Attorney, Agent, or Firm* — IP Business Solutions, LLC.

(57) ABSTRACT

An electronic apparatus includes a main body, a door, and a projecting member. The door is attached to the main body to be openable and closable with respect to the main body and covers components contained in the main body. The projecting member projects from an inside surface of the door toward an interior of the main body. The projecting member is graspable by a user.

8 Claims, 7 Drawing Sheets

ELECTRONIC APPARATUS WITH PROJECTING MEMBER PROJECTING FROM INSIDE SURFACE OF DOOR TOWARD INTERIOR OF APPARATUS BODY

INCORPORATION BY REFERENCE

This application claims priority to Japanese Patent Application No. 2023-057306 filed on 31 Mar. 2023, the entire contents of which are incorporated by reference herein.

BACKGROUND

The present disclosure relates to electronic apparatuses.

Generally, image forming apparatuses need maintenance or the like and are therefore provided at their side surfaces with doors for opening the interiors thereof to the outside. In large-sized image forming apparatuses, such as a large-sized multifunction peripheral, an industrial printer, and a commercial printer, the size of doors provided at their side surfaces is also large. In this case, there arises a problem of how to hold the doors in assembling the image forming apparatuses.

Meanwhile, there is generally known an image forming apparatus capable of setting the order of opening and closing a plurality of covers (doors) with a simple structure. In this general image forming apparatus, a locking portion is provided on the inside surface of a front cover being one of the plurality of covers and prevents the front cover from being opened during operation of the image forming apparatus.

SUMMARY

A technique improved over the aforementioned techniques is proposed as one aspect of the present disclosure.

An electronic apparatus according to an aspect of the present disclosure includes a main body, a door, and a projecting member. The door is attached to the main body to be openable and closable with respect to the main body and covers components contained in the main body. The projecting member projects from an inside surface of the door toward an interior of the main body. The projecting member is graspable by a user.

DETAILED DESCRIPTION

Figure 1:
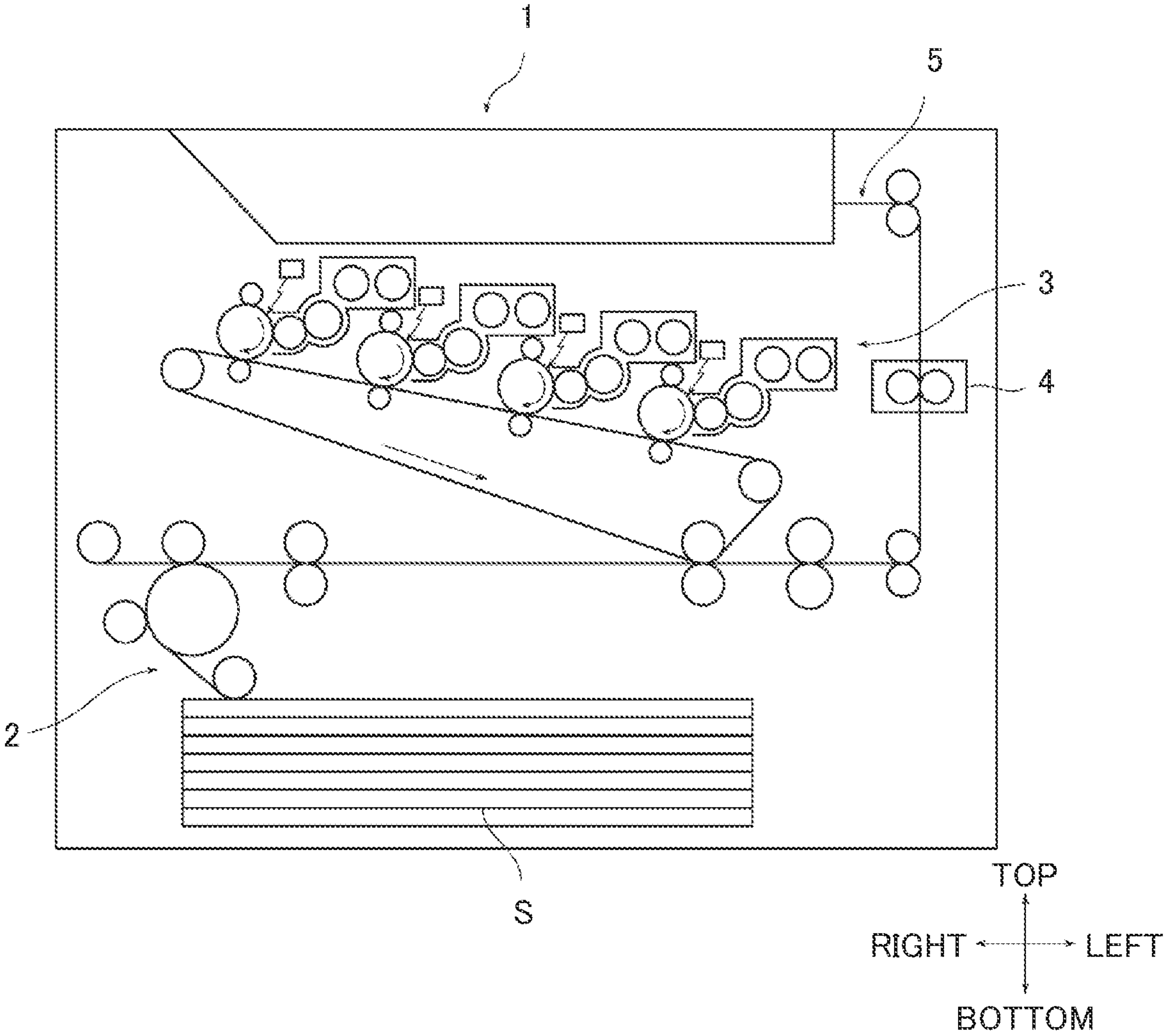
FIG. 1 is a view showing an example of an internal structure of a general image forming apparatus.

Hereinafter, a description will be given of one embodiment of the present disclosure with reference to the drawings. Throughout the drawings, the same or equivalent portions and components are designated by the same reference characters and further description is omitted.

First, an internal structure of an image forming apparatus 1 will be described with reference to FIG. 1. FIG. 1 is a view showing an example of an internal structure of a general image forming apparatus 1. FIG. 1 is a view of the image forming apparatus 1 when viewed from the front. In FIG. 1, its top-to-bottom direction is defined according to the top-to-bottom direction of the image forming apparatus 1 when it is installed in normal conditions of use, and the direction orthogonal to its top-to-bottom direction and front-to-back direction is defined as its right-to-left direction.

The image forming apparatus 1 is an apparatus that forms an image on a sheet S. As shown in FIG. 1, the image forming apparatus 1 includes a sheet feed device 2, an image forming device 3, a fixing device 4, and an ejection device 5.

The sheet feed device 2 contains sheets P, picks up a sheet S contained therein, and feeds it to the image forming device 3. The image forming device 3 forms an image on the sheet S by toner. When the image forming apparatus 1 employs an electrophotographic imaging system, the image forming device 3 develops a toner image on the sheet S. When the image forming apparatus 1 employs an electrophotographic imaging system, the fixing device 4 applies heat and pressure to the toner image developed on the sheet S to fix the toner image on the sheet S. The ejection device 5 ejects to the outside the sheet S with an image formed thereon by the image forming device 5.

The sheet feed device 2, the image forming device 3, the fixing device 4, and the ejection device 5 are components of the image forming apparatus 1.

Figure 2:
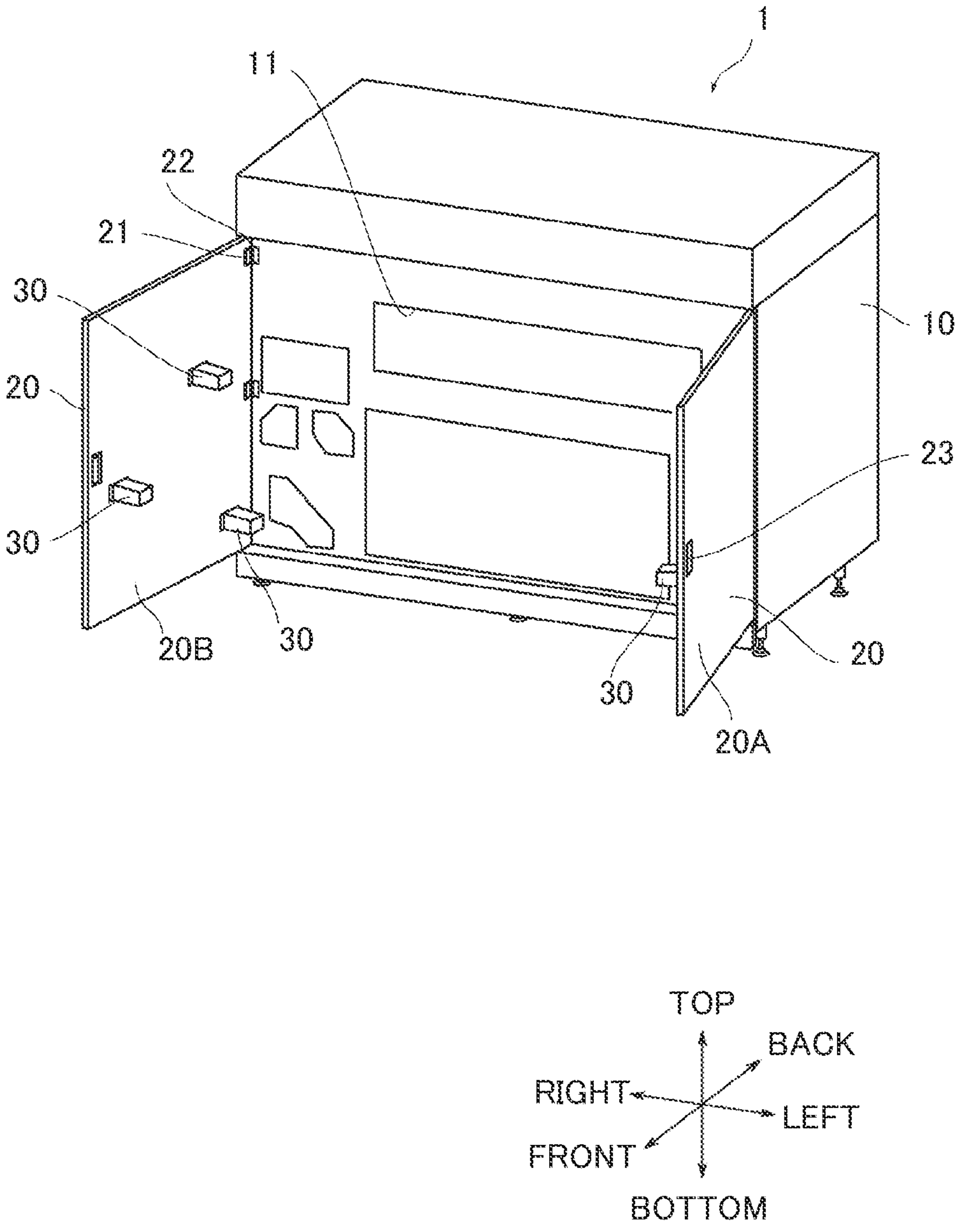
FIG. 2 is a perspective view of an image forming apparatus according to an embodiment of the present disclosure.
Figure 3:
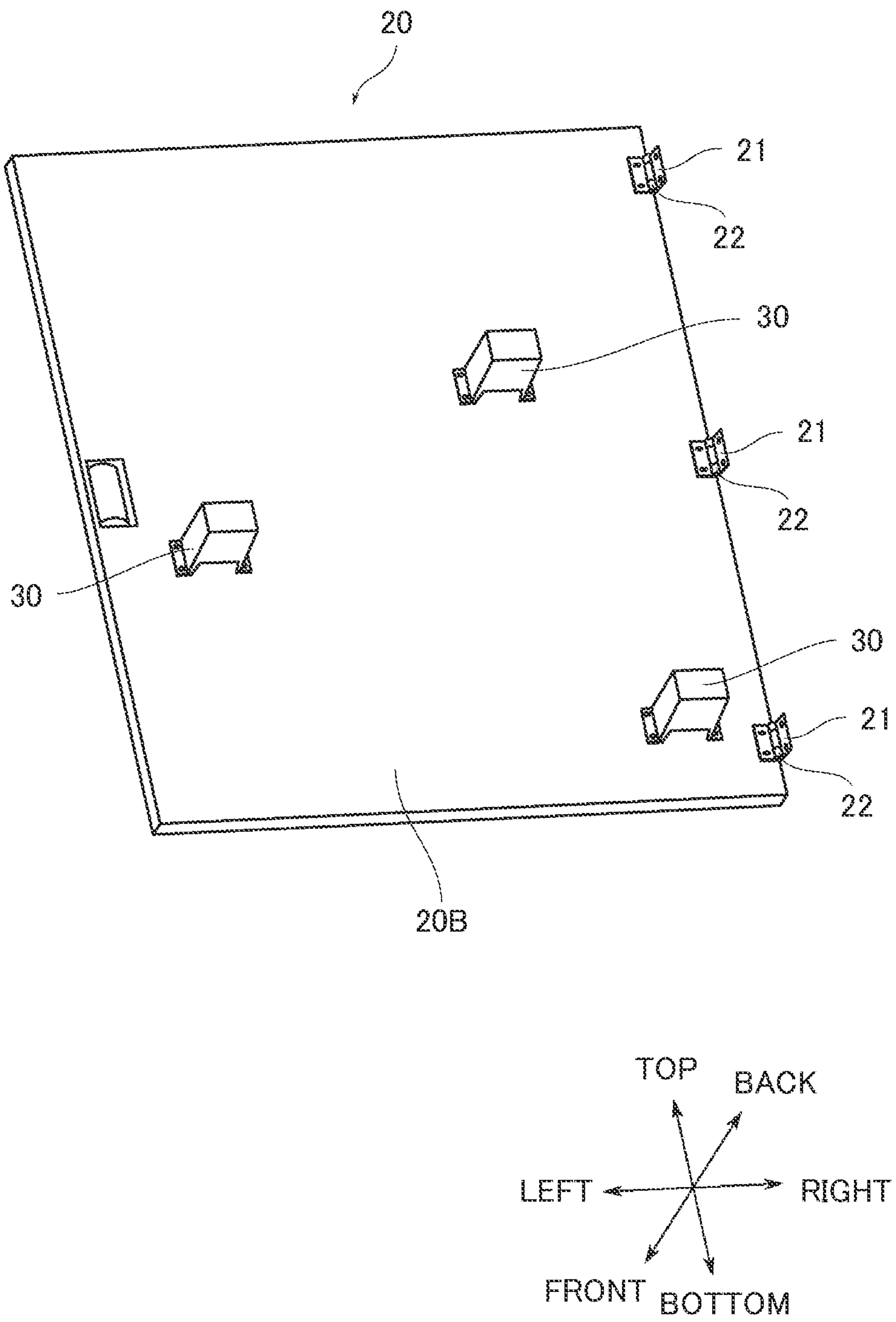
FIG. 3 is a perspective view of a door of the image forming apparatus shown in FIG. 2 when viewed from inside.
Figure 4:
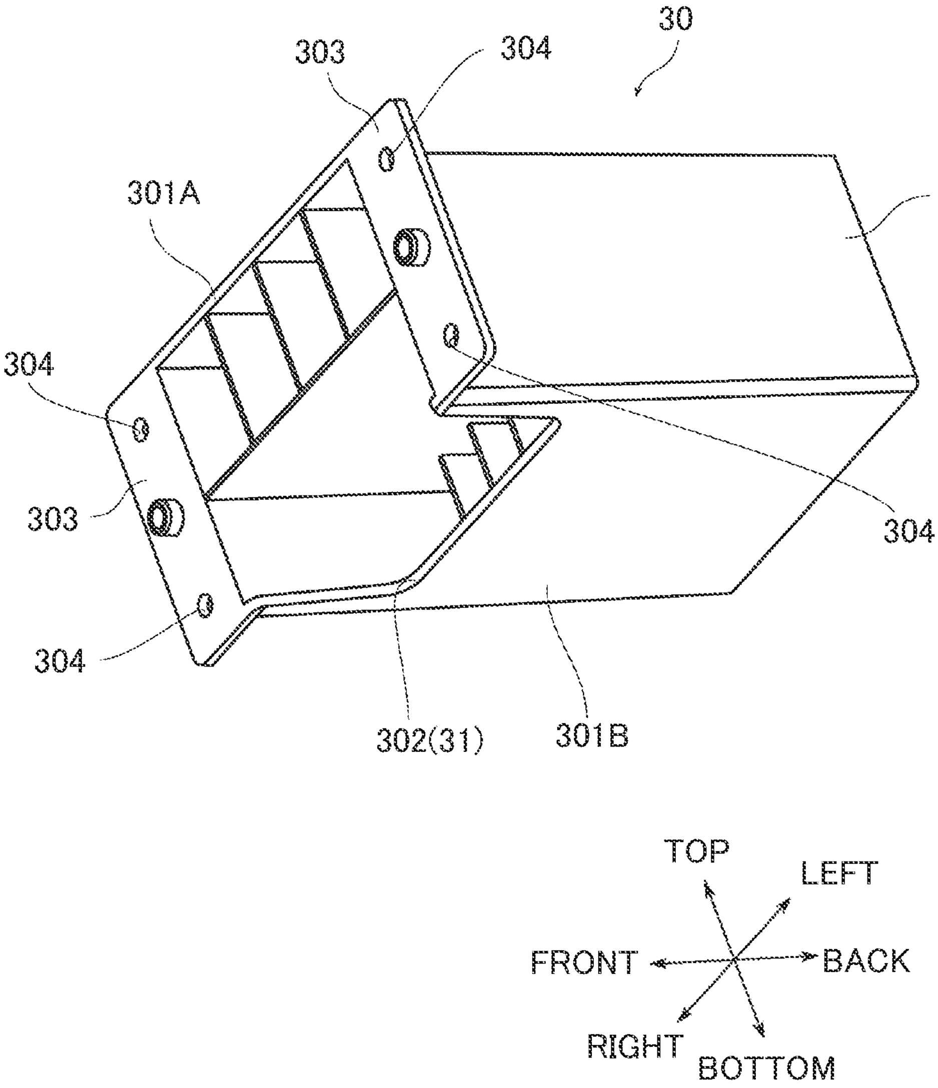
FIG. 4 is a perspective view of a projecting member of the image forming apparatus shown in FIG. 2.

Next, a description will be given of the structure of an image forming apparatus 1 as an electronic apparatus according to this embodiment with reference to FIGS. 2 to 4. FIG. 2 is a perspective view of the image forming apparatus 1 according to this embodiment. The electronic apparatus is not limited to the image forming apparatus 1 shown in FIG. 2 and may be, for example, an optional device connectable with the image forming apparatus 1. FIG. 3 is a perspective view of a door 20 of the image forming apparatus 1 shown in FIG. 2 when viewed from inside. FIG. 4 is a perspective view of a projecting member 30 of the image forming apparatus 1 shown in FIG. 2. In FIG. 2, the components of the image forming apparatus 1 are omitted. Throughout the drawing, the top-to-bottom direction is defined according to the top-to-bottom direction of the image forming apparatus 1 when it is installed in normal conditions of use, and the front-to-back direction is defined by considering the side of the image forming apparatus 1 at which the door 20 is provided as the front side. The direction orthogonal to the top-to-bottom direction and front-to-back direction is defined as the right-to-left direction. In FIGS. 3 and 4, the directions when the door 20 is closed are shown.

Examples of the electronic apparatus according to the present disclosure include not only an image forming apparatus 1, such as a copier, a printer or a multifunction peripheral, equipped with components as described above, but also sheet feed and conveying devices (optional devices) which are provided, along with the above components, in a general image forming apparatus to assist image formation. The structure of the door 20 of the image forming apparatus 1 described below is applicable to any general image forming apparatus equipped with components described above.

As shown in FIGS. 2 to 4, the image forming apparatus 1 includes a main body 10, a door 20, and projecting members 30.

As shown in FIGS. 2 and 3, the main body 10 is formed, as an example, in the shape of an approximately hexahedron having a hollow interior. The main body 10 contains components as described above. A side surface of the main body 10 is provided with openings 11 through which maintenance and the like of the internal components are performed. In this embodiment, the openings 11 are provided at the front surface of the main body 10.

The door 20 is attached to the main body 10 to be openable and closable with respect to the main body 10 and covers the openings 11 of the main body 10 to thus cover the components contained in the main body 10. The door 20 is formed in a plate-like shape and size that can cover the openings 11 of the main body 10. In this embodiment, the door 20 composed of two panels covers the openings 11 of the main body 10. The openings 11 are provided for the user to detach or attach the components therethrough.

The door 20 is attached to the main body 10 by hinges 21. The door 20 is pivotable via pivot pins 22 of the hinges 21 with respect to the main body 10. In this embodiment, the right door panel 20 is attached to the main body 10 by hinges 21 provided at the right end of the main body 10 and the left door panel 20 is attached to the main body 10 by hinges 21 provided at left end of the main body 10, that is, the door 20 is a center-opening, double-panel door.

An outer surface 20A of the door 20 includes a handle 23 which is provided away from the hinges 21 and by which the door 20 is opened and closed.

The projecting members 30 are mounted on the inside surface 20B of the door 20. The projecting members 30 project from the inside surface 20B of the door 20 toward the interior of the main body 10. The projecting members 30 are preferably formed using projections already provided in the image forming apparatus 1 in order that when levers or other engagement members for engagement of the components to the main body 10 are not located in place, the projections interfere with the levers or other engagement members to keep the door 20 from being closed and thus prevent the image forming apparatus 1 from malfunction. This prevents a cost increase due to separate provision of new members.

When the levers or other engagement members for engagement of the components to the main body 10 is located in place, the projecting members 30 on the door 20 pass through the openings 11. The projecting members 30 on the door 20 are arranged at locations where they can pass through the openings 11. Therefore, the right and left door panels 20 can cover up the components seen through the openings 11 and suitably close the image forming apparatus 1.

As shown in FIGS. 3 and 4, the projecting members 30 are graspable by the user. In other words, the projecting members 30 have a shape that the user can easily apply force to lift or hold the door 20. The projecting members 30 preferably include respective finger-engaging portions 31 engageable with the user's finger. The finger-engaging portions 31 are, for example, depressions formed by depressing the projecting members 30, projections integrally formed with the projecting members 30, or openings formed by partially cutting away the projecting members 30.

In this embodiment, as shown in FIG. 4, the projecting member 30 includes a projecting member body 301 and a cutaway 302.

The projecting member body 301 is formed, as an example, in the shape of an approximately hexahedron having a hollow interior. The projecting member body 301 is open at its one end surface 301A. The cutaway 302 is provided in one side surface 301B of the projecting member body 301 by cutting away the one side surface 301B from one edge of the open end surface 301A of the projecting member body 301. The cutaway 302 formed in this manner is an opening communicated with the internal space of the projecting member body 301 and acts as the finger-engaging portion 31 in which the user's finger can be caught.

A flange 303 is integrally formed with the peripheral edges of the open end surface 301A of the projecting member body 301, except for the edge of the end surface 301A where the cutaway 302 is formed. The flange 303 includes screw holes 304 formed therein to allow the projecting member 30 to be mounted on the door 20.

Figure 5:
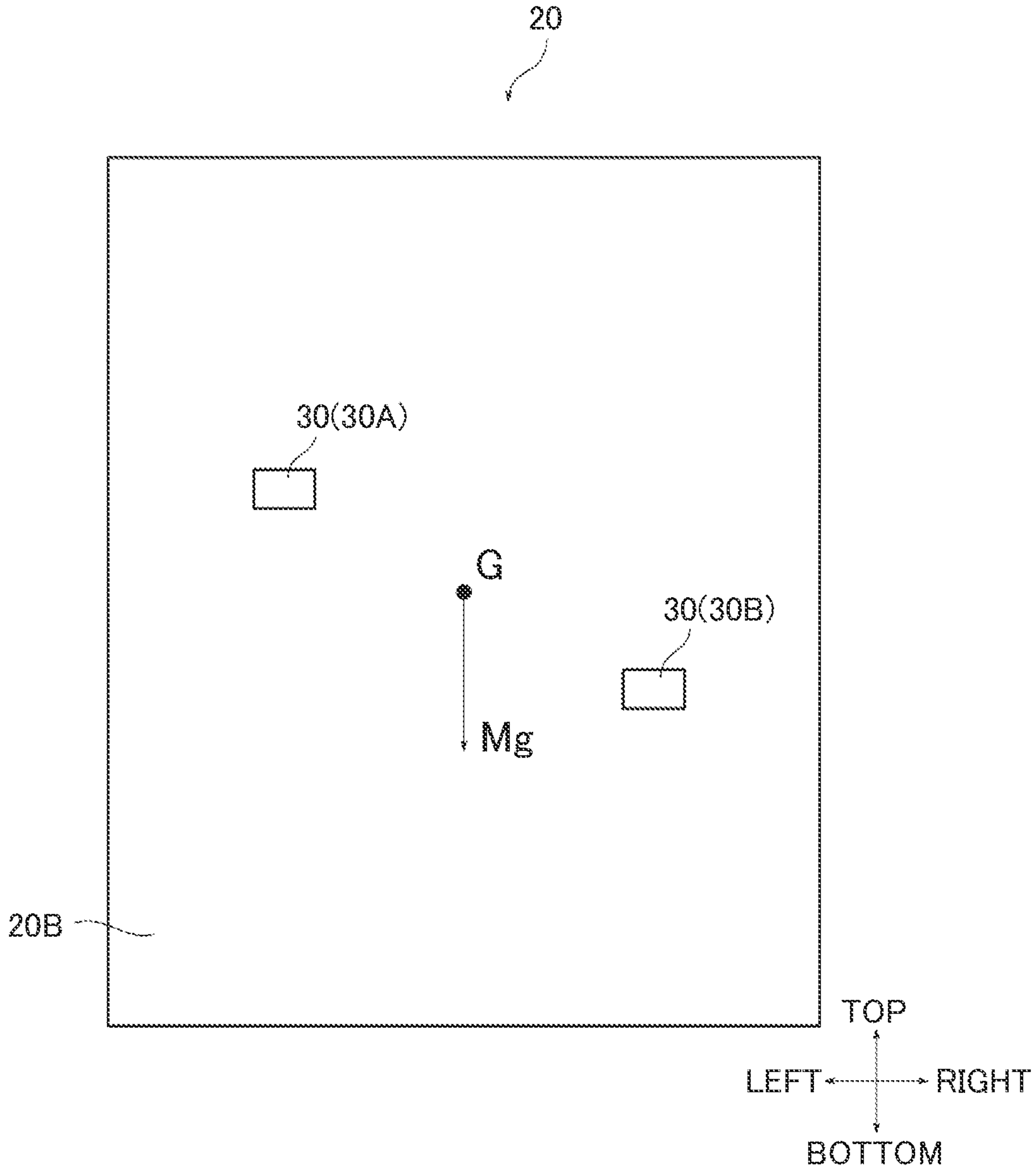
FIGS. 5 to 7 are views each showing an arrangement of a plurality of projecting members on the door of the image forming apparatus according to the embodiment of the present disclosure.
Figure 6:
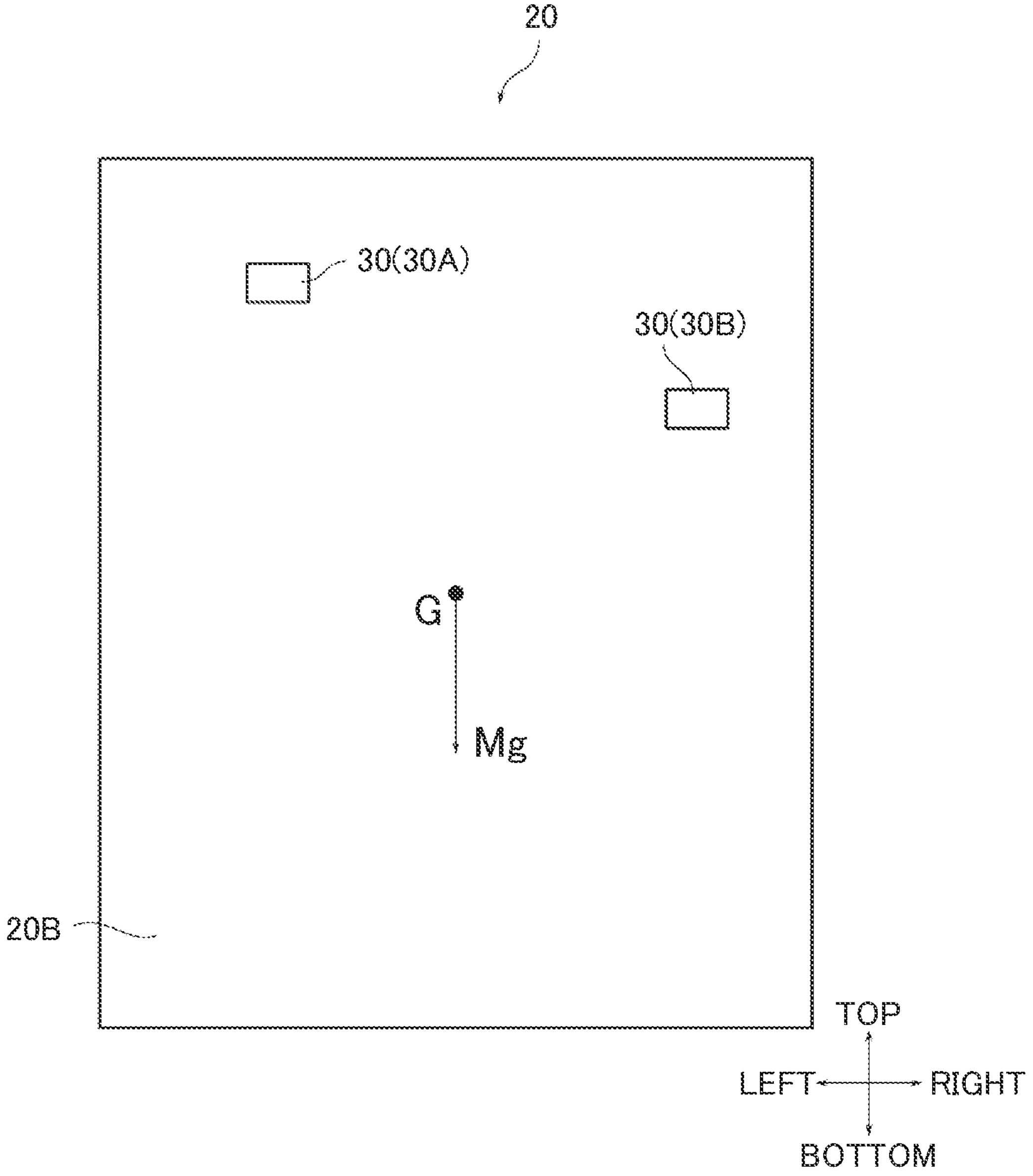
Figure 7:
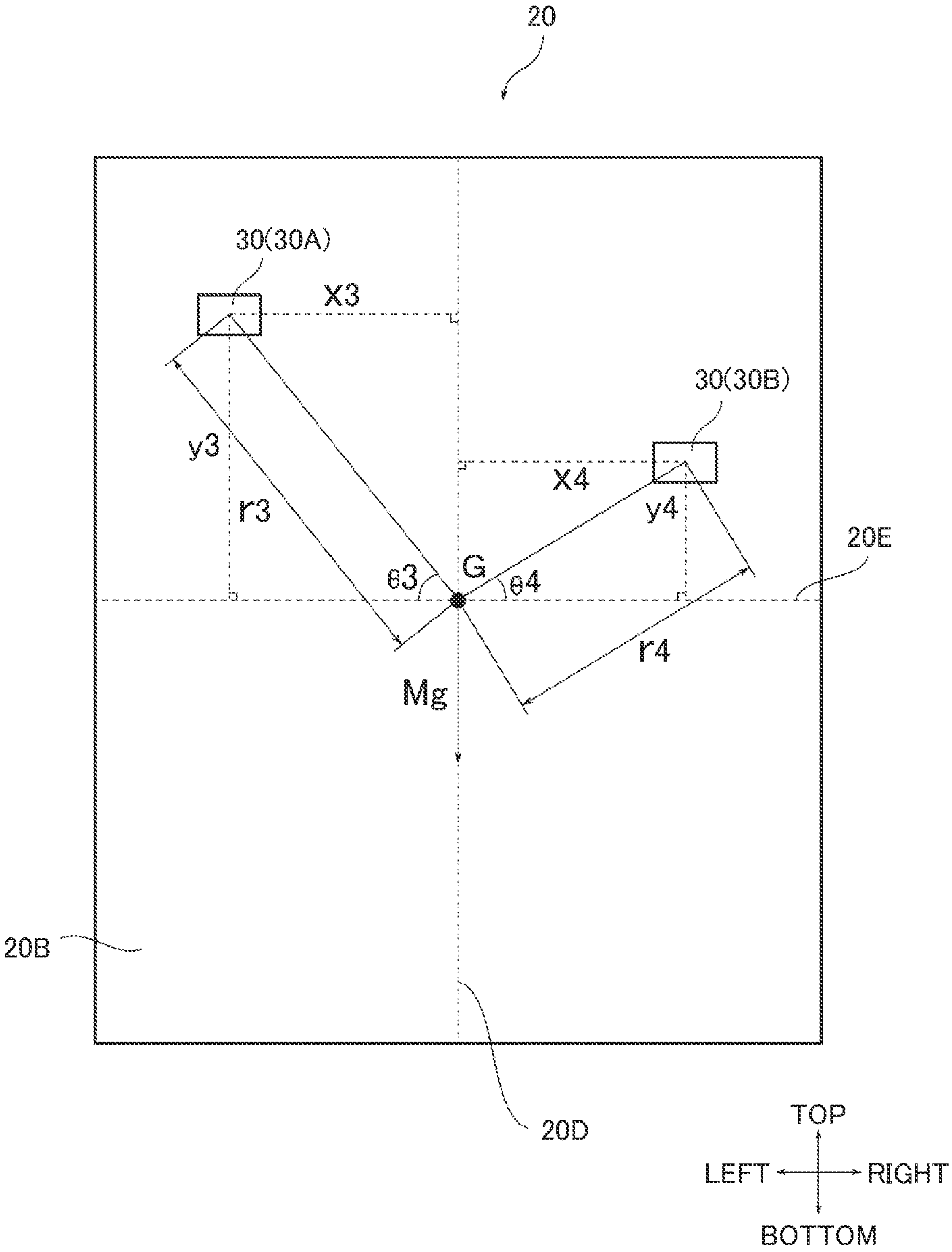

Next, a description will be given of the arrangement of a plurality of projecting members 30 on the door 20 of the image forming apparatus 1 according to the one embodiment of the present disclosure, with further reference to FIGS. 5 to 7. FIGS. 5 to 7 are views each showing an arrangement of a plurality of projecting members 30 on the door 20 of the image forming apparatus 1 according to the one embodiment of the present disclosure.

A plurality of projecting members 30 described above are provided on each door panel 20. The plurality of projecting members 30 are arranged on each door panel 20, for example, in the following three manners.

In the first manner, as shown in FIG. 5, the plurality of projecting members 30 are arranged across the gravity center G of the door panel 20 in a horizontal direction. To be more specific and for the sake of simplicity, referring to FIG. 5, a projecting member 30A and a projecting member 30B, among the plurality of projecting members 30, are discussed below. In this case, the plurality of projecting members 30A and 30B are arranged so that the gravity center G of the door panel 20 alone is located halfway between the projecting member 30A and projecting member 30B on the door panel 20. In this relation, the projecting members 30 have little weight relative to the door panel 20 and, therefore, have substantially no effect on the location of the gravity center of the door panel 20. Likewise, the hinges 21 and the pivot pins 22 also have little weight relative to the door panel 20 and are therefore not taken into consideration for the sake of simplicity.

Assuming that the mass of the door panel 20 is represented by M, the gravity applied to the gravity center G of the door panel 20 is represented by Mg.

In the case of the first manner, when the user grasps the projecting member 30A and the projecting member 30B and lifts the door panel 20, the gravity Mg loading on the projecting member 30A and the projecting member 30B is balanced and, therefore, the door panel 20 is less likely to fall, which reduces the load on the user.

Next, in the second manner, as shown in FIG. 6, the plurality of projecting members 30 on the door panel 20 are arranged above the gravity center G of the door panel 20 alone. Regarding FIG. 6, a description that overlaps with that referring to FIG. 5 will be omitted.

Like the case in FIG. 5, a projecting member 30A and a projecting member 30B, among the plurality of projecting members 30, are discussed below. The projecting member 30A and the projecting member 30B are arranged above the gravity center G of the door panel 20.

In the case of the second manner, when the user grasps the projecting member 30A and the projecting member 30B and lifts the door panel 20, the door panel 20 is even less likely to fall and, therefore, the load on the user can be more suitably reduced.

Next, in the third manner, as shown in FIG. 7, the plurality of projecting members 30 on the door panel 20 are arranged so that their respective moments of rotation about the gravity center G of the door panel 20 are balanced each other.

Regarding FIG. 7, a description that overlaps with that referring to FIG. 5 will be omitted.

Specifically, in FIG. 7, a center line 20D vertically extending through the gravity center G of the door panel 20 and a center line 20E horizontally extending through the gravity center G of the door panel 20 are assumed. Furthermore, for the sake of simplicity, a projecting member 30A and a projecting member 30B, among the plurality of projecting members 30, are discussed below.

Referring to FIG. 7, assume that the horizontal distance from the center line 20D to the projecting member 30A is represented as the distance x3 and the horizontal distance from the center line 20D to the projecting member 30B is represented as the distance x4. Furthermore, assume that the vertical distance from the center line 20E to the projecting member 30A is represented as the distance y3 and the vertical distance from the center line 20E to the projecting member 30B is represented as the distance y4. Moreover, assume that the angle between an imaginary line through the center of the projecting member 30A and the gravity center G and the center line 20E is represented by θ3 and the angle between an imaginary line through the center of the projecting member 30B and the gravity center G and the center line 20E is represented by θ4.

In this situation, assuming that the straight-line distance between the projecting member 30A and the gravity center G is represented by r3 and the gravity loading on the cover is represented by Mg, the moment of rotation M3 applied to the projecting member 30A is as follows:

$$M3 = r3 \times Mg \times \cos\theta 3$$

Assuming that the straight-line distance between the projecting member 30B and the gravity center G is represented by r4, the moment of rotation M4 applied to the projecting member 30B is as follows:

$$M4 = r4 \times Mg \times \cos\theta 4$$

The projecting member 30A and the projecting member 30B are preferably arranged so that the moment of rotation M3 applied to the projecting member 30A and the moment of rotation M4 applied to the projecting member 30B are balanced as far as possible.

In the case of the third manner, the moment of rotation M3 applied to the projecting member 30A and the moment of rotation M4 applied to the projecting member 30B are balanced. Therefore, when the user grasps the projecting member 30A and the projecting member 30B and lifts the door panel 20, the gravity Mg loading on the projecting member 30A and the projecting member 30B is balanced and, therefore, the door panel 20 is less likely to rotate and incline, which more suitably reduces the load on the user.

There may be cases where limitations of arrangeable regions of the projecting members 30A and 30B make it difficult to balance the respective moments of rotation M3 and M4 applied to the projecting members 30A and 30B. In these cases, when the projecting members 30A and 30B are arranged to minimize the difference between the respective moments of rotation M3 and M4 applied to the projecting members 30A and 30B, the load on the user can be reduced.

The projecting members 30 are mounted, at the locations where they are arranged in any one of the first to third manners, on the door panel 20 with their cutaways 302 facing down. A person can more easily apply force to support an object from below than force to suspend it from above. Since the cutaways 302 face down, the user can insert fingers through the cutaways 302 into the internal spaces of the projecting member bodies 301, support the projecting member bodies 301 with the palms from below, and lift the door panel 20. Therefore, the user can easily lift even a large-sized, heavy-weight door panel 20.

The locking portion of the general image forming apparatus described previously may be able to be used, in assembling the cover, by the user to hold the cover. However, because the locking portion is a member provided for the purpose of locking the cover, it in many cases has a shape not suitable for the user to grasp it, such as, for example, a small size or a pointed corner. Therefore, even if the locking member is provided, there is still a problem of inconvenience for the user to hold, particularly, a large-sized, heavy-weight cover.

Unlike the above general image forming apparatus, the image forming apparatus 1 according to the present disclosure includes the projecting members 30 mounted on the door 20 and graspable by the user. Thus, in attaching or detaching the door 20 to or from the main body 10 of the image forming apparatus 1, the user can grasp the projecting members 30 and hold the door 20.

In assembling the door 20 into the main body 10, there is a need for a detailed alignment work for aligning the main body 10 with the door 20 to make the door 20 openable and closable with respect to the main body 10 and securing them by hinges 21. Since the projecting members 30 can be grasped by the user to hold the door 20, the user can easily hold the door 20 in the alignment work and, therefore, can easily perform the assembly work. Particularly, since a plurality of projecting members 30 are provided, the user can hold the door 20 with one projecting member 30 grasped by each hand. Thus, the user can hold the door 20 with less effort and more easily perform the assembly work.

In addition, when the projecting members 30 are formed of projections which, when a component, such as an inner cover or a guide plate, provided in the interior of the image forming apparatus 1 or levers to be moved in detachment and attachment of components are not returned in place, interfere with the above component or levers to keep the door 20 from being closed and to which another function as handles is added, the need to provide any separate projecting members 30 is eliminated, which prevents a cost increase and increases the workability.

The description of the embodiment of the present disclosure has so far been given with reference to the drawings. However, the present disclosure is not limited to the above embodiment and can be implemented in various forms without departing from the gist of the present disclosure. The various formations of the disclosure can be made by appropriately combining a plurality of components disclosed in the above embodiment. For example, some of all the components disclosed in the above embodiment may be deleted. For the sake of ease of understanding, the drawings may be schematic representation, primarily of components. The number of components and so on shown in the drawings may be different from those of actual components for convenience of creation of the drawings. The components described in the above embodiment are merely illustrative, not particularly limited, and can be changed variously without substantially departing from the effects of the present disclosure.

Although in the above embodiment the finger-engaging portion 31 (see FIG. 4) is formed of the cutaway 302, the finger-engaging portion 31 according to the present disclosure is not limited to this. For example, a finger-engaging portion 31 may be provided by forming the projecting member body 301 in the shape of a solid, approximately hexahedron and depressing a middle portion thereof in a direction of extension from a mounting surface where the projecting member body 301 is mounted to the door 20 (the one end surface 301A thereof) toward the interior of the body 301 to allow fingers to be caught therein. Alternatively, a finger-engaging portion 31 may be provided by forming, at an end of the projecting member body 301 opposite to the mounting surface where the projecting member body 301 is mounted to the door 20 (the one end surface 301A thereof), an extending member extending orthogonally to the direction of extension from the mounting surface to the interior of the body 301, integral with the projecting member body 301, and engageable with the user's finger.

INDUSTRIAL APPLICABILITY

The present disclosure is applicable to the field of image forming apparatuses.

While the present disclosure has been described in detail with reference to the embodiments thereof, it would be apparent to those skilled in the art the various changes and modifications may be made therein within the scope defined by the appended claims.

What is claimed is:

1. An electronic apparatus comprising:

a main body;

a door that is attached to the main body to be openable and closable with respect to the main body and covers components contained in the main body; and a projecting member that projects from an inside surface of the door toward an interior of the main body, the projecting member being graspable by a user, wherein the projecting member comprises a plurality of projecting members.

2. The electronic apparatus according to claim 1, wherein the projecting member comprises a finger-engaging portion engageable with a finger of a user.

3. The electronic apparatus according to claim 2, wherein the projecting member comprises: a projecting member body having a hollow interior; and a cutaway provided in a side surface of the projecting member body, and the cutaway forms the finger-engaging portion.

4. The electronic apparatus according to claim 1, wherein the plurality of projecting members are arranged across a gravity center of the door in a horizontal direction.

5. The electronic apparatus according to claim 4, wherein the main body includes an opening through which the components are detachable from and attachable to the main body, and the plurality of projecting members are arranged at locations where the plurality of projecting members are capable of passing through the opening.

6. The electronic apparatus according to claim 1, wherein the plurality of projecting members are arranged so that respective moments of rotation of the plurality of projecting members about a fulcrum on a center line vertically extending through a gravity center of the door are balanced.

7. The electronic apparatus according to claim 1, wherein the plurality of projecting members are arranged above a gravity center of the door.

8. The electronic apparatus according to claim 1, wherein the components include an image forming device that forms an image on a sheet.

* * * * *